US012120611B2

United States Patent
Siraj et al.

(10) Patent No.: US 12,120,611 B2
(45) Date of Patent: Oct. 15, 2024

(54) WAKE-UP BY A NETWORK DEVICE

(71) Applicant: HEWLETT PACKARD ENTERPRISE DEVELOPMENT LP, Houston, TX (US)

(72) Inventors: Mohd Shahnawaz Siraj, Santa Clara, CA (US); Shruthi Koundinya, Santa Clara, CA (US); Manoj Thawani, Santa Clara, CA (US); Zhijun Ren, Beijing (CN); Gaurav Patwardhan, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 131 days.

(21) Appl. No.: 17/599,727

(22) PCT Filed: May 1, 2019

(86) PCT No.: PCT/CN2019/085395
§ 371 (c)(1),
(2) Date: Sep. 29, 2021

(87) PCT Pub. No.: WO2020/220368
PCT Pub. Date: Nov. 5, 2020

(65) Prior Publication Data
US 2022/0167272 A1 May 26, 2022

(51) Int. Cl.
*H04W 52/02* (2009.01)
(52) U.S. Cl.
CPC .............................. *H04W 52/0229* (2013.01)
(58) Field of Classification Search
CPC . H04W 52/0229; H04W 52/028; Y02D 30/70
See application file for complete search history.

(56) References Cited

U.S. PATENT DOCUMENTS 8,326,960 B2 12/2012 Bailey et al.
8,407,332 B1 3/2013 Kraipak et al.
(Continued)

FOREIGN PATENT DOCUMENTS

CN 103618759 A 3/2014
CN 107294876 A 10/2017
(Continued)

OTHER PUBLICATIONS

Datto, "Wake-on-LAN", available online at <https://help.aem.autotask.net/en/Content/5AGENT/WakeOnLAN.htm>, retrieved on Mar. 14, 2019, 3 pages.
(Continued)

*Primary Examiner* — Marcos L Torres
(74) *Attorney, Agent, or Firm* — Hewlett Packard Enterprise Patent Department

(57) ABSTRACT

Examples described herein provide wake-up of a network device. Examples include receiving, by a network interface of a first network device having a first Media Access Control (MAC) address, a request to wake-up a second network device having a second MAC address that is assigned to a same subnet as the first MAC address, and in response to the request, generating, by the first network device, a first wake-up frame having a destination address of the second MAC address and configured to cause the second network device to transition from operating in the first power mode to operating in the second power mode. Examples include transmitting, by the network interface of the first network device, the first wake-up frame to the second MAC address of the second network device.

15 Claims, 6 Drawing Sheets

(56) References Cited

U.S. PATENT DOCUMENTS

| | | | |
|---|---|---|---|
| 2006/0112287 A1 | 5/2006 | Paljug | |
| 2011/0138044 A1* | 6/2011 | Bailey | H04L 12/12 |
| | | | 709/225 |
| 2015/0363178 A1* | 12/2015 | Houliston | G06F 1/3209 |
| | | | 717/177 |

FOREIGN PATENT DOCUMENTS

| | | |
|---|---|---|
| CN | 107809788 A | 3/2018 |
| CN | 108322491 A | 7/2018 |

OTHER PUBLICATIONS

International Search Report and Written Opinion received for PCT Application No. PCT/CN2019/085395, mailed on Jan. 22, 2020, 7 pages.

ZOHO Corp, "Wake on LAN Tool—Boot Machines Remotely | ManageEngine Desktop Central", available online at <https://www.manageengine.com/uk/desktop-management-msp/help/wake_on_lan_tool.html>, 2018, 4 pages.

* cited by examiner

WAKE-UP BY A NETWORK DEVICE

BACKGROUND

A network device may provide connectivity to a wireless network by establishing wireless communication links between nodes of the network. For instance, a network device may establish wireless communication links between nodes of a wireless local area network (WLAN). Moreover, a network device may provide connectivity to a wireless network by establish communication links between the wireless network and another network. For instance, a network device may provide connectivity to a WLAN by establishing wired and/or wireless communication links between the WLAN and a local area network (LAN), another wireless local area network (WLAN), a wide area network (WAN) (e.g., the Internet), a cellular network, or a combination thereof.

Multiple network devices may be used to provide connectivity to a wireless network. For example, a first network device may operate as a gateway node which is connected to a core network (e.g., the Internet) via a wired communication link, and a second network device may operate as a remote node which is connected to the first network device via a wired and/or wireless communication link. In such example, each of the first and second network devices may establish wireless communication links between nodes (e.g., client devices) of a WLAN. It may be advantageous to use multiple network devices to provide connectivity to a wireless network, for example, to extend the range of the network, to increase client capacity, channel utilization, signal quality, reliability, or bandwidth of the network, or a combination thereof.

BRIEF DESCRIPTION OF THE DRAWINGS

Various features and advantages of the invention will become apparent from the following description of examples of the invention, given by way of example only, which is made with reference to the accompanying drawings, of which.

DETAILED DESCRIPTION

Figure 1:
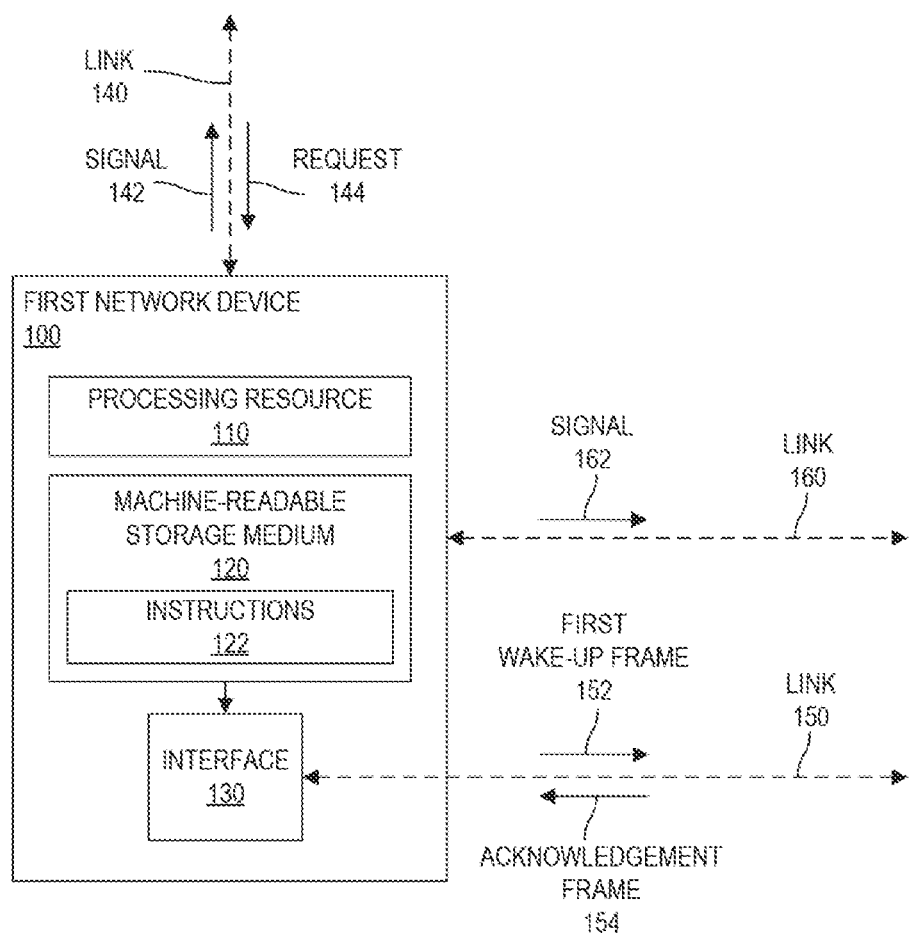
FIG. 1 is a block diagram of wake-up by an example network device.

As noted above, multiple network devices may be used to provide connectivity to a wireless network. However, the use of multiple network devices in a wireless network may lead to increased energy consumption. For instance, large-scale WLANs, such as enterprise or campus WLANs, may have hundreds or even thousands of network devices. In such examples, there may be energy inefficiency when all of the network devices must operate at full power mode at all times, even when some of the network devices are not in use.

Recently, there have been efforts to increase energy efficiency for network devices by using Wake-on-LAN (WoL) or Wake-on-WLAN (WoWLAN) technology. As used herein, "WoL" refers to an Ethernet standard that allows control of a target device in a LAN by transmitting a broadcast frame known as a "magic packet" to the target device. As used herein, "WoWLAN" refers to a supplementary Wi-Fi standard to WoL that allows control of a target device in a WLAN by transmitting a magic packet to the target device via a Wi-Fi-based signal. A magic packet may contain anywhere within its payload 6 bytes each having a value of 255 (i.e., FF FF FF FF FF FF in hexadecimal), followed by sixteen repetitions of the target device's 48-bit MAC address, for a total of 102 bytes. When a target device receives a magic packet, the magic packet is configured to instruct the target device to "wake-up," e.g., transition from operating in a power save mode to operating in a full power mode. By using WoL and WoWLAN technology, a network device may be placed in a power save mode when not in use, and then instructed to wake-up prior to use by transmitting a magic packet to the network device. Thus, WoL and WoWLAN may increase energy efficiency for network devices.

Despite the great potential that WoL and WoWLAN offer for increasing energy efficiency of network devices, existing WoL and WoWLAN techniques may experience at least the following problems for wireless networks. First, when magic packets are broadcast frames, they may not be routed between multiple hops (e.g., intermediate nodes) of a wireless network. For instance, when a magic packet is transmitted as a broadcast frame using a connectionless protocol, such as User Data Protocol (UDP), the magic packet may be dropped by an intermediate router before reaching a target network device, as the intermediate router may not recognize the destination address (i.e., broadcast address) of the magic packet. Moreover, it may not be possible to transmit a magic packet using a connection-oriented protocol, such as Transmission Control Protocol (TCP), when the target network device is in a power save mode. Thus, existing WoL and WoWLAN techniques may not be used to reliably transmit magic packets to network devices in a wireless network having multi-hop routing. Second, despite efforts to overcome this problem by transmitting magic packets as subnet directed broadcasts (SDBs) rather than as broadcast frames, SDBs may require changes to configurations of intermediate routers. As used herein, an "SDB" (i.e., IP directed broadcast) refers to a transmission of a layer 3 (L3) packet whose destination address is a broadcast address for a given destination subnet, but which originates from a node that is not itself part of that destination subnet. When a packet transmitted by SDB reaches an intermediate router, the intermediate router may broadcast the packet using a layer 2 (L2) broadcast. However, as noted above, allowing SDBs for intermediate routers may require changing configurations of the intermediate routers, and this requirement may be burdensome for wireless networks having multiple network devices. Furthermore, wireless networks having routers which are configured to allow SDBs may be more vulnerable to flooding of the wireless network by broadcast packets.

To address these issues, examples described herein may receive, by a network interface of a first network device having a first Media Access Control (MAC) address, a request to wake-up a second network device having a second MAC address that is assigned to a same subnet as the first MAC address, and in response to the request, generate, by the first network device, a first wake-up frame having a destination address of the second MAC address and configured to cause the second network device to transition from operating in the first power mode to operating in the second power mode, and transmit, by the network interface of the first network device, the first wake-up frame to the second MAC address of the second network device.

In this manner, examples described herein may, in response the request, generate a first wake-up frame having the second MAC address as the destination address and configured to cause the second network device to transition from operating in the first power mode to operating in the second power mode, and transmit, by the network interface, the first wake-up frame to the second MAC address, thereby allowing wake-up of the second network device without requiring transmitting a broadcast frame. Thus, examples described herein may provide greater reliability as compared to existing WoL and WoWLAN techniques, which require transmitting magic frames as broadcast frames which can be dropped by intermediate routers. Moreover, examples described herein may provide greater ease of implementation and less vulnerability to flooding as compared to existing WoL and WoWLAN techniques, which require configuring intermediate routers to transmit magic packets as SDBs.

In examples described herein, a "frame" refers to a formatted unit of data which contains (i.e., encapsulates) a single network packet. According to the Open Systems Interconnection model (OSI model), a frame refers to a protocol data unit (PDU) at the L2 link layer. Moreover, under the protocols for the Institute of Electrical and Electronic Engineers (IEEE) 802.3 (e.g., Ethernet), IEEE 802.15.1, IEEE 802.15.4, Bluetooth®, ZigBee®, or Z-Wave®, a frame may comprise a source MAC address and a destination MAC address. As used herein, the term "broadcast frame" refers to a frame having a destination MAC address that is a broadcast address. A broadcast address may have 6 bytes each having a value of 255 (i.e., FF FF FF FF FF FF in hexadecimal.) It will be understood by one skilled in the art that a packet may comprise any suitable format(s) of units of data, now known or later developed.

In examples described herein, a "packet" (i.e., network packet) refers to a formatted unit of data which may be transmitted across one or more communication links of one or more networks. According to the OSI model, a packet refers to a PDU at the L3 network layer. Moreover, under the Transmission Control Protocol/Internet Protocol (TCP/IP), a packet (i.e., IP packet) may comprise an IP header. An IP header comprises a source IP address and a destination IP address. In some examples, a packet may comprise a header and a payload. In such examples, an IP header may comprise control information for delivering the payload, such as source and destination information, sequencing information, service information, flagging information, other transmission-related information, or the like, or a combination thereof. In some examples, the payload may comprise data which is carried by the packet. It will be understood by one skilled in the art that a packet may comprise any suitable format(s) of units of data, now known or later developed.

In examples described herein, a "subnet" (i.e., IP subnet) refers to a logical partition of an IP network. A subnet comprises one or more IP addresses. A subnet may be characterized by its subnet mask (i.e., netmask), which is a bitmask that, when applied by a bitwise AND operation to any IP address in a network, yields a routing prefix for an IP network.

Referring now to the drawings, FIG. 1 is a block diagram of an example network device 100 to transmit a first wake-up frame 152 based on request 144. In the example of FIG. 1, network device 100 (which may be referred to herein as "first" network device 100) includes at least one processing resource 110 and at least one machine-readable medium 120 comprising (e.g., encoded with) at least instructions 122 that are executable by the at least one processing resource 110 of network device 100 to implement functionalities described herein in relation to instructions 122.

In the example of FIG. 1, network device 100 may be a wireless access point (WAP). In some examples, network device 100 may engage in any network data transmission operations, including, but not limited to, switching, routing, bridging, or a combination thereof. In examples described herein, a "WAP" refers to receiving points for any known or convenient wireless access technology which may later become known. Specifically, the term WAP is not intended to be limited to IEEE 802.11-based WAPs. A WAP generally functions as an electronic device that is adapted to allow wireless devices to connect to a wired network via various communications standards. A WAP may include any necessary hardware components to perform the inventions disclosed herein, including, but not limited to: processors, memories, display devices, input devices, communications equipment, etc. It will be understood by one of ordinary skill in the art that network device 100 may be any suitable type(s) of network devices made by any suitable manufacturer(s).

In the example of FIG. 1, network device 100 includes a network interface 130 having a first Media Access Control (MAC) address. Network interface 130 may comprise a network interface controller (NIC) having one or more ports (e.g., Ethernet ports), one or more sockets, one or more adapters, or a combination thereof. Moreover, although FIG. 1 shows that network device 100 comprises one network interface 130, it will be understood that network device 100 may any suitable number and type(s) of network interfaces.

In the example of FIG. 1, network interface 130 may comprise a radio having the first MAC address. In some examples, one or more basic service set identifiers (BSSIDs) may corresponding to the first MAC address of the radio of network interface 130. In some examples, the radio may operate at one or more frequency bands. For example, the radio may operate at a 5 GHz band which conforms to the IEEE 802.11ac standard, a 2.4 GHz band which conforms to one or more of the IEEE 802.11ac, 802.11n, and 802.11g standards, or a combination thereof. It will be understood by one skilled in the art that the radio of network interface 130 may transmit and receive wireless signals that conform to any suitable type(s) of wireless communications standard(s), now known or later developed, and/or operate at any suitable frequency range(s). In some examples, the radio may comprise an antenna which transmits directional and/or omni-directional signals. In examples described herein, a "directional" signal refers to a signal which radiates more strongly in one or more directions as compared to one or more other directions along an azimuth plane (i.e., horizontal plane), whereas an "omnidirectional" signal refers to a signal which radiates equally in all directions along an azimuth plane. In some examples, the at least one radio may comprise a phased array antenna. In examples described herein, a "phased array antenna" refers to an array of antennas which can create a directional signal which can be electronically steered to point in different directions without moving the antennas. In some examples, the phased array antenna may comprise an array of directional and/or omnidirectional antennas which can focus radio frequency (RF) energy towards specific spatial directions. It will be understood by one skilled in the art that network interface 130 may comprise at least one radio which may comprise any suitable type(s) of antenna(s), now known or later developed. Moreover, it will be understood by one skilled in the art that network device 100 may comprise, two, four, eight, or any suitable number of radios.

In the example of FIG. 1, network device 100 may establish a communication link 140 with a network coordinator. In the example of FIG. 1, network device 100 may establish a communication link 150 with a second network device. In the example of FIG. 1, network device 100 may establish a communication link 160 with a third network device. Moreover, in the example of FIG. 1, network device 100 may establish wireless communication links for one or more nodes (e.g., client devices) of a WLAN. In some examples, one or more of communication links 140, 150, and 160 may comprise a wired link such as a wire, a cable, or an optical fiber, a wireless link such as a Wi-Fi link, a Bluetooth® link, a Bluetooth Low Energy® (BLE) link, a ZigBee® link, a Z-Wave® link, a cellular link, or the like, or a combination thereof. It will be understood by one skilled in the art that each of communication links 140, 150, and 160 may use any suitable type(s) of wired and/or wireless link(s), now known or later developed. In some examples, one or more of communication links 140, 150, and 160 may be established via network interface 130. In some examples, one or both of communication links 140 and 160 may use at least one connection-oriented protocol, such as TCP, at least one connectionless protocol, such as UDP, or the like, or a combination thereof. It will be understood by one skilled in the art that each of communication links 140 and 160 may use any suitable type(s) of data transmission protocol(s), now known or later developed. In some examples, communication link 150 may use at least one connectionless protocol, such as UDP. It will be understood by one skilled in the art that communication link 150 may use any suitable type(s) of data transmission protocol(s), now known or later developed.

In examples described herein, a client device may comprise a processor, memory, and input/output interfaces for wired and/or wireless communication. In some examples, a client device may comprise a laptop computer, a desktop computer, a mobile device, and/or other wireless devices, although examples of the disclosure are not limited to such devices. In examples described herein, a mobile device may refer to devices that are (or may be) carried and/or worn by a user. For instance, a mobile device can be a phone (e.g., a smartphone), a tablet, a personal digital assistant (PDA), smart glasses, and/or a wrist-worn device (e.g., a smartwatch), among other types of mobile devices. In some examples, a client device may comprise a network device.

In the example of FIG. 1, instructions 122 may be configured to receive request 144 to wake-up a second network device having a second MAC address that is assigned to a same subnet as the first MAC address. In some examples, request 144 may be received from the network coordinator via communication link 140. Request 144 may comprise at least one frame having a destination MAC address that corresponds to a MAC address (e.g., the first MAC address) of network device 100. Request 144 may comprise at least one packet having a source IP address that corresponds to an IP address assigned to a network coordinator and/or a destination IP address that corresponds to an IP address assigned to network device 100. Request 144 may comprise at least one packet having a payload configured to indicate the first MAC address, the second MAC address, a netmask corresponding to the subnet assigned to the first and second MAC addresses, or a combination thereof. It will be understood that request 144 may comprise any suitable type of frame and/or packet with any suitable type(s) of payload(s).

In the example of FIG. 1, instructions 122 may be configured to, based on (e.g., in response to) request 144, generate first wake-up frame 152 having the second MAC address as a destination address and configured to cause the second network device to wake-up (e.g., transition from operating in a first power mode to operating in a second power mode.) First wake-up frame 152 may have the first MAC address as a source address. First wake-up frame 152 may comprise a packet which is configured to instruct the second network device to wake-up. In some examples, the packet may contains anywhere within its payload 6 bytes each having a value of 255 (i.e., FF FF FF FF FF FF in hexadecimal), followed by sixteen repetitions of the target computing device's 48-bit MAC address, for a total of 102 bytes. It will be understood that first wake-up frame 152 may comprise any suitable type of frame comprising any suitable type of packet with any suitable type(s) of payload(s).

In examples described herein, the first power mode may correspond to a power save mode or a power off mode of the second network device. In examples described herein, the second power mode may correspond to a full power mode or a power on mode of the second network device. In examples described herein, a "power save mode" of a device refers to a power mode which consumes less energy than another power mode for a given period of time, and a "power off mode" of a device refers to a power mode which consumes no energy for a given period of time. In examples described herein, a "full power mode" or "power on mode" of a device refers to a power mode which consumes more energy than another power mode for a given period of time. In some examples, a power save or power off mode of a network device may correspond to a standby mode which allows the network device to receive a wake-up packet, but does not allow the network device to perform certain other functionalities which the network device may perform in a full power or power on mode.

In the example of FIG. 1, instructions 122 may be configured to transmit, by network interface 130, first wake-up frame 152 to the second MAC address of the second network device. That is, instructions 122 may be configured to transmit first wake-up frame 152 as an L2 unicast frame to the second MAC address of the second network device. In some examples, first wake-up frame 152 may be transmitted to the second network device via communication link 150.

In the example of FIG. 1, instructions 122 may be configured to receive an acknowledgment frame 154 based on first wake-up frame 152 received at the second MAC address of the second network device. In some examples, acknowledgment frame 154 may be received by network interface 130 of network device 100. In some examples, acknowledgement frame 154 may be received from the second network device via communication link 150. Acknowledgment frame 154 may have the second MAC address as a source address and the first MAC address as a destination address. Acknowledgement frame 154 may comprise a packet having a payload that is configured to indicate to network device 100 that first wake-up frame 152 was received at the second MAC address of the second network device. It will be understood that acknowledgment frame 154 may comprise any suitable type of frame comprising any suitable type of packet with any suitable type(s) of payload(s).

In the example of FIG. 1, instructions 122 may be configured to, based on (e.g., in response to) a triggering event, determine that first wake-up frame 152 was received at the second MAC address of the second network device. In some examples, the triggering event may be a signal received by network device 100 from a computing device (e.g., the second network device, a client device, etc.) In some examples, the triggering event may occur after a predetermined time period after first wake-up frame 152 is received at the second MAC of the second network device.

In the example of FIG. 1, instructions 122 may be configured to transmit, to a network coordinator, a signal 142 indicating the first MAC address. In some examples, signal 142 may be transmitted to the network coordinator via communication link 140. In the example of FIG. 1, instructions 122 may be configured to, based on (e.g., in response to) signal 142, receive request 144 to wake-up the second network device. Signal 142 may comprise at least one packet having a payload configured to indicate to the network coordinator the first MAC address, a netmask corresponding to the subnet assigned to the first MAC address, or a combination thereof. Signal 142 may comprise at least one frame having a source MAC address that corresponds to a MAC address (e.g., first MAC address) of network device 100 and/or a destination MAC address that corresponds to a MAC address associated with the network coordinator. Signal 142 may comprise at least one packet having a source IP address that corresponds to an IP address assigned to network device 100 and/or a destination IP address that corresponds to an IP address assigned to the network coordinator. It will be understood that signal 142 may comprise any suitable type of frame and/or packet with any suitable type(s) of payload(s).

In the example of FIG. 1, instructions 122 may be configured to, based on (e.g., in response to) first wake-up frame 152 transmitted to the second MAC address of the second network device, transmit, to a third network device, a signal 162 indicating that first wake-up frame 152 was transmitted to the second MAC address of the second network device. In some examples, signal 162 may be transmitted to the second MAC address of the second network device via communication link 160. Signal 162 may correspond to first wake-up frame 152. In some examples, signal 162 may comprise first wake-up frame 152. Signal 162 may comprise at least one packet having a payload configured to indicate to the third network device that first wake-up frame 152 was transmitted the second MAC address of the second network device. Signal 162 may comprise at least one frame having a source MAC address that corresponds to a MAC address (e.g., first MAC address) of network device 100 and/or a destination MAC address that corresponds to a third MAC address associated with the third network device, wherein the third MAC address is assigned to the same subnet as the first MAC address and the second MAC address. Signal 162 may comprise at least one packet having a source IP address that corresponds to an IP address assigned to network device 100 and/or a destination IP address that corresponds to an IP address assigned to the third network device. It will be understood that signal 162 may comprise any suitable type of frame and/or packet with any suitable type(s) of payload(s).

In this manner, the example network device 100 of FIG. 1 may provide improved wake-up functionality. For instance, instructions 122 may be configured to, in response to request 144, generate first wake-up frame 152 having the second MAC address as the destination address and configured to cause the second network device to transition from operating in the first power mode to operating in the second power mode, and transmit, by network interface 130, first wake-up frame 152 to the second MAC address, thereby allowing wake-up of the second network device without requiring transmitting a broadcast frame. Thus, example network device 100 may provide greater reliability as compared to existing WoL and WoWLAN techniques which require transmitting magic packets as broadcast frames which can be dropped by intermediate routers. Moreover, example network device 100 may provide greater ease of implementation and less vulnerability to flooding because unlike existing WoL and WoWLAN techniques, wake-up functionality by network device 100 does not require configuring intermediate routers between network devices to forward magic packets as SDBs.

Figure 2:
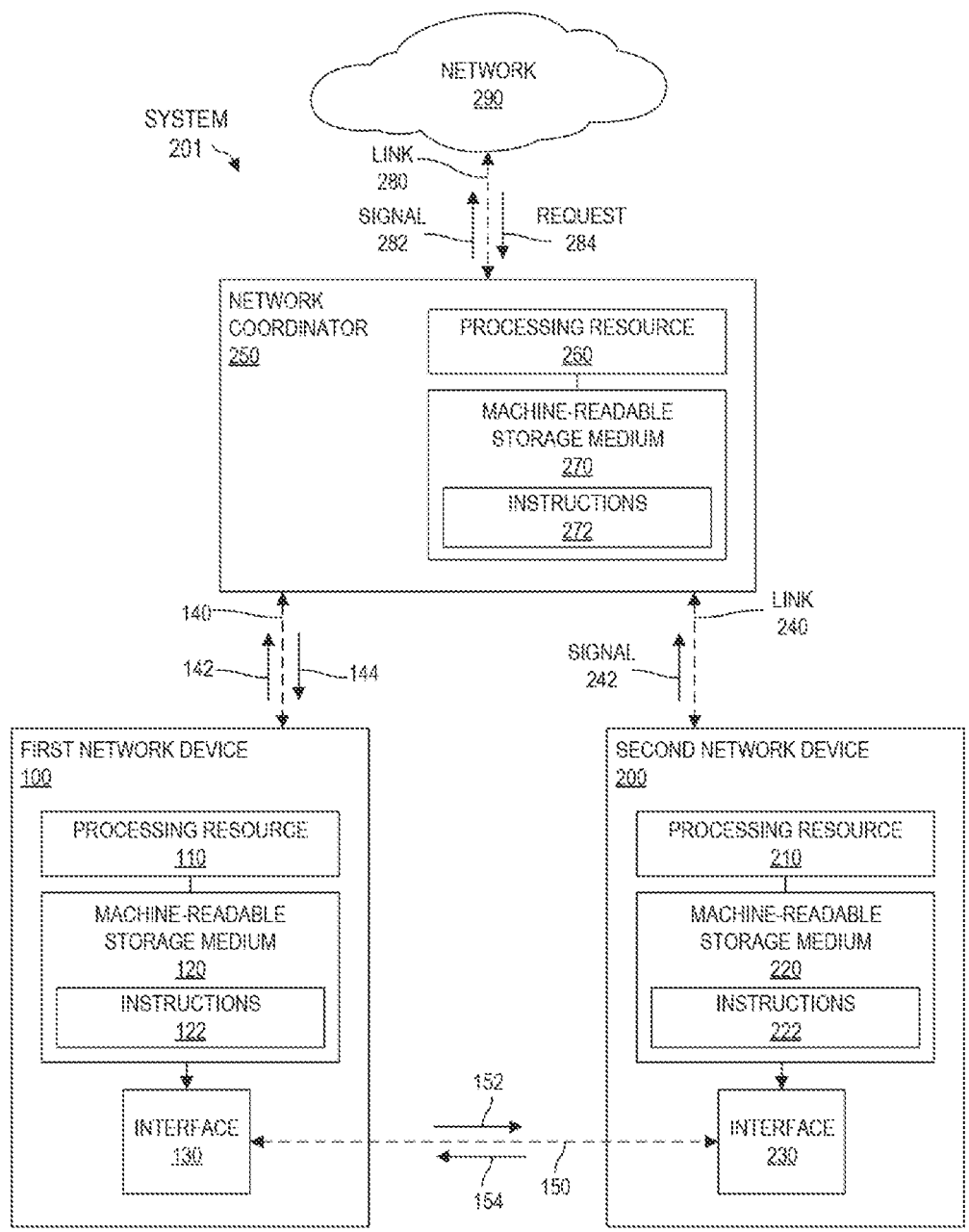
FIG. 2 is a block diagram of an example system for wake-up by a first network device.

FIG. 2 is a block diagram of an example system 201 for wake-up by a network device. In the example of FIG. 2, system 201 may include first network device 100, as described above in relation to FIG. 1. System 201 may include a second network device 200. System 201 may include a network coordinator 250. System 201 may include a network 290.

In the example of FIG. 2, second network device 200 includes at least one processing resource 210 and at least one machine-readable medium 220 comprising (e.g., encoded with) at least instructions 222 that are executable by the at least one processing resource 210 of second network device 200 to implement functionalities described herein in relation to instructions 222. In some examples, one or more instructions 222 may be the same as or similar to one or more instructions 122, as described above.

In the example of FIG. 2, second network device 200 may engage in any network data transmission operations, including, but not limited to, switching, routing, bridging, or a combination thereof. In some examples, second network device 200 may comprise a WAP. It will be understood by one of ordinary skill in the art that second network device 200 may be any suitable type(s) of network devices made by any suitable manufacturer(s).

In the example of FIG. 2, second network device 200 includes a network interface 230 having the second MAC address. Network interface 230 may comprise a NIC having one or more ports (e.g., Ethernet ports), one or more sockets, one or more adapters, or a combination thereof. Moreover, although FIG. 2 shows that second network device 200 comprises one network interface 230, it will be understood that second network device 200 may any suitable number and type(s) of network interfaces.

In the example of FIG. 2, network interface 230 may comprise a radio having the second MAC address. In some examples, one or more BSSIDs may corresponding to the second MAC address of the radio of network interface 230. In some examples, the radio may operate at one or more frequency bands. For example, the radio may operate at a 5 GHz band which conforms to the IEEE 802.11ac standard, a 2.4 GHz band which conforms to one or more of the IEEE 802.11ac, 802.11n, and 802.11g standards, or a combination thereof. It will be understood by one skilled in the art that the radio of network interface 230 may transmit and receive wireless signals that conform to any suitable type(s) of wireless communications standard(s), now known or later developed, and/or operate at any suitable frequency range(s). In some examples, the radio may comprise an antenna which transmits directional and/or omnidirectional signals. In some examples, the radio may comprise a phased array antenna. It will be understood by one skilled in the art that the radio of network interface 230 may comprise any suitable type(s) of antenna(s), now known or later developed. Moreover, it will be understood by one skilled in the art that second network device 200 may comprise, two, four, eight, or any suitable number of radios, and that second network device 200 may have a same number or a different number of radios as first network device 100.

In the example of FIG. 2, first network device 100 may establish communication link 140 with network coordinator 250, and second network device 200 may establish a communication link 240 with network coordinator 250. Moreover, in the example of FIG. 2, first network device 100 and second network device 200 may establish wireless communication links with one or more nodes (e.g., client devices) of a WLAN. In some examples, communication link 240 may be established via network interface 230. In some examples, communication link 240 may comprise a wired link such as a wire, a cable, or an optical fiber, a wireless link such as a Wi-Fi link, a Bluetooth link, a BLE link, a ZigBee® link, a Z-Wave® link, a cellular link, or the like, or a combination thereof. It will be understood by one skilled in the art that communication link 240 may use any suitable type(s) of wired and/or wireless link(s), now known or later developed. In some examples, communication link 240 may be established via network interface 230. In some examples, communication link 240 may use at least one connection-oriented protocol, such as TCP, at least one connectionless protocol, such as UDP, or the like, or a combination thereof. It will be understood by one skilled in the art that communication link 240 may use any suitable type(s) of data transmission protocol(s), now known or later developed. In some examples, first network device 100, second network device 200, and network coordinator 250 may operate as nodes in a WLAN.

In the example of FIG. 2, network coordinator 250 includes at least one processing resource 260 and at least one machine-readable medium 270 comprising (e.g., encoded with) at least instructions 272 that are executable by the at least one processing resource 260 of network coordinator 250 to implement functionalities described herein in relation to instructions 272. In the example of FIG. 2, network coordinator 250 is a service (e.g., instructions 272 stored in the at least one machine-readable medium and executable by the at least one processing resource) executed on at least one computing device that coordinates switching, routing, and/or bridging across one or more networks (e.g., network 290.) In some examples, network coordinator 250 may execute on at least one computing device in a LAN or WLAN. In some examples, network coordinator 250 may execute on at least one cloud computing device. In some examples, network coordinator 250 may execute on at least one or more software-defined networks (SDNs). In some examples, network coordinator 250 may be provided to one or more networks as a service (aaS). In some examples, network coordinator 250 may gather network operating information from various nodes (e.g., network devices) of one or more networks, including network traffic load information, network topology information, network usage information, etc. In such examples, network coordinator 250 may then transmit commands to various network infrastructure devices of the one or more networks to alter network topology and network routing to achieve various network efficiency and efficacy goals.

In the example of FIG. 2, network coordinator 250 may establish communication link 280 with network 290. In some examples, communication link 280 may comprise a wired link, such as a wire, a cable, an optical fiber, or the like, or a combination thereof, a wireless link, such as a Wi-Fi link, a Bluetooth® link, a BLE link, a ZigBee® link, a Z-Wave® link, a cellular link, or the like, or a combination thereof, or a combination of at least one wired link and at least one wireless link. It will be understood by one skilled in the art that communication link 280 may use any suitable type(s) of wired and/or wireless link(s), now known or later developed. In some examples, communication link 280 may be established via one or more network interfaces of network coordinator 250. In some examples, communication link 280 may be established via one or more radios of network coordinator 250. Communication link 280 may use any suitable data transmission protocol(s), including at least one connection-oriented protocol such as Transmission Control Protocol (TCP), at least one connectionless protocol such as User Datagram Protocol (UDP), or the like, or a combination thereof.

In the example of FIG. 2, network 290 may comprise a computer network. In some examples, network 290 may comprise one or more local area networks (LANs), virtual LANs (VLANs), wireless local area networks (WLANs), virtual private networks (VPNs), SDNs, wide area networks (WANs), the Internet, or the like, or a combination thereof. In examples described herein, a WAN may comprise, for example, a wired WAN, wireless WAN, hybrid WAN, software-defined WAN (SD-WAN), or the like, or a combination thereof. In the example of FIG. 2, network 290 may comprise a cellular network. It will be understood by one skilled in the art that network 290 may comprise any suitable type(s) of network(s), now known or later developed.

In the example of FIG. 2, instructions 222 may be configured to receive, by network interface 230, first wake-up frame 152. In the example of FIG. 2, instructions 222 may be configured to, based on (e.g., in response to) first wake-up frame 152, transition from operating in the first power mode to operating in the second power mode. In the example of FIG. 2, instructions 222 may be configured to, based on (e.g., in response to) first wake-up frame 152, transmit acknowledgment frame 154. In some examples, acknowledgment frame 154 may be transmitted by network interface 230 of second network device 200.

In the example of FIG. 2, instructions 222 may be configured to transmit, to network coordinator 250, a signal 242 indicating the second MAC address. In some examples, signal 242 may be transmitted to network coordinator 250 via communication link 240. Signal 242 may comprise at least one packet having a payload configured to indicate to network coordinator 250 the second MAC address, a netmask corresponding to the subnet assigned to the second MAC address, or a combination thereof. Signal 242 may comprise at least one frame having a source MAC address that corresponds to a MAC address (e.g., the second MAC address) of second network device 200 and/or a destination MAC address that corresponds to a MAC address associated with network coordinator 250. Signal 242 may comprise at least one packet having a source IP address that corresponds to an IP address assigned to second network device 200 and/or a destination IP address that corresponds to an IP address assigned to network coordinator 250. It will be understood that signal 242 may comprise any suitable type of frame and/or packet with any suitable type(s) of payload(s).

In the example of FIG. 2, instructions 272 may be configured to receive first signal 142 indicating the first MAC address. In the example of FIG. 2, instructions 272 may be configured to receive a second signal 242 indicating the second MAC address. In the example of FIG. 2, instructions 272 may be configured to, based on (e.g., in response to) first signal 142 and/or second signal 242, transmit, to first network device 100, request 144 to wake-up second network device 200.

In the example of FIG. 2, instructions 272 may be configured to receive a third signal indicating a third MAC address of a third network device, wherein the third MAC address is assigned to the same subnet as the first and second MAC addresses. In the example of FIG. 2, instructions 272 may be configured to, based on (e.g., in response to) the third signal, transmit, to the third MAC address of the third network device, a request to determine whether a wake-up frame was transmitted by first network device 100 to the second MAC address of second network device 200.

In the example of FIG. 2, instructions 272 may be configured to receive a request 284 to instruct network coordinator 250 to transmit request 144 to first network device 100. In some examples, request 284 may be received from network 290 via communication link 280. In some examples, request 284 may be received from at least one computing device of network 290. In some examples, request 284 may be received from at least one cloud computing device of network 290. In some examples, request 284 may be received from at least one or more networks as a service (aaS) of network 290.

In the example of FIG. 2, instructions 272 may be configured to receive a request to instruct network coordinator 250 to transmit, to the third network device, the request to determine whether a wake-up frame was transmitted by first network device 100 to the second MAC address of second network device 200. In some examples, the request may be received from network 290 via communication link 280. In some examples, the request may be received from at least one computing device of network 290. In some examples, the request be received from at least one cloud computing device of network 290. In some examples, the request may be received from at least one or more networks aaS of network 290.

In the example of FIG. 2 instructions 272 may be configured to transmit a signal 282 to network 290. In some examples, signal 282 may be transmitted to network 290 via communication link 280. In the example of FIG. 2, signal 282 may indicate the first MAC address of first network device 100, the second MAC address of second network device 200, the third MAC address of the third network device, a netmask corresponding to the subnet assigned to the first, second, and/or third MAC address, or a combination thereof.

In some examples, network 290 may include at least one processing resource and at least one machine-readable medium comprising (e.g., encoded with) instructions that are executable by the processing resource to implement functionalities described herein in relation to network 290. In some examples, network 290 may comprise at least one computing device, at least one cloud computing device, at least one network aaS, or a combination thereof. In some examples, network 290 may instruct first network device 100, second network device 200, and/or the third network device to operate in a first power mode and/or a second power mode.

In this manner, the example system 201 of FIG. 2 may provide improved wake-up by a network device. For instance, instructions 222 may be configured to receive, at network interface 230, first wake-up frame 152, and based on (e.g., in response to) first wake-up frame 152, transition from operating in the first power mode to operating in the second power mode, thereby allowing first network device 100 to wake-up second network device 200 without requiring transmitting a broadcast frame. Thus, example system 201 may provide greater reliability as compared to existing WoL and WoWLAN techniques, which require transmitting magic packets as broadcast frames which can be dropped by intermediate routers. Moreover, example system 201 may provide greater ease of implementation and less vulnerability to flooding because unlike existing WoL and WoWLAN techniques, system 201 does not require configuring intermediate routers between network devices to forward magic packets as SDBs.

Figure 3:
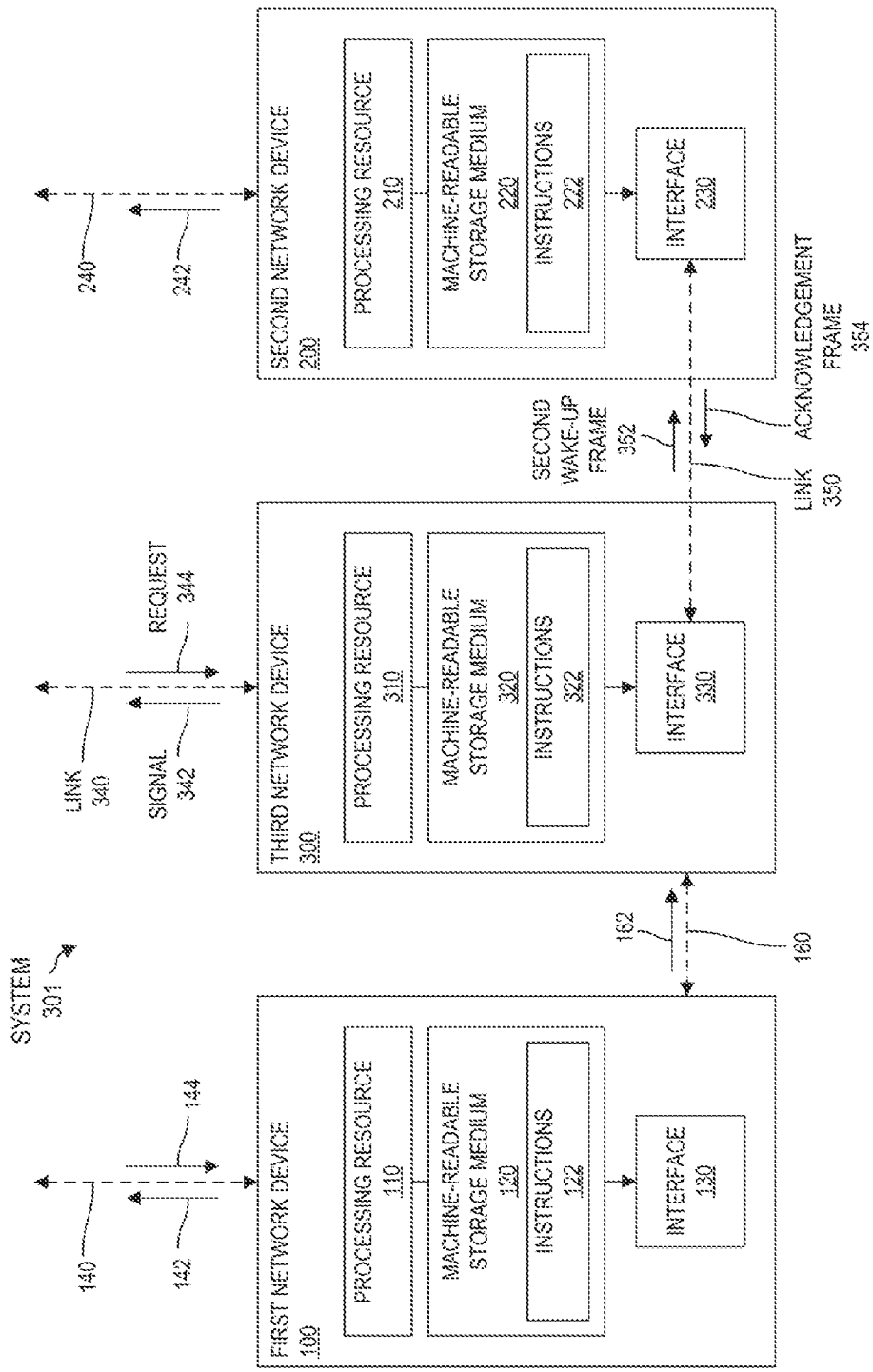
FIG. 3 is a block diagram of an example system for wake-up by a third network device.

FIG. 3 is a block diagram of an example system 301 for wake-up by third network device 300. In the example of FIG. 3, system 301 may include first network device 100, as described above in relation to FIGS. 1 and 2. System 301 may include second network device 200, as described above in relation to FIG. 2. System 301 may include network coordinator 250, as described above in relation to FIG. 2. System 301 may include network 290, as described above in relation to FIG. 2. System 301 may include third network device 300.

In the example of FIG. 3, third network device 300 includes at least one processing resource 310 and at least one machine-readable medium 320 comprising (e.g., encoded with) at least instructions 322 that are executable by the at least one processing resource 310 of third network device 300 to implement functionalities described herein in relation to instructions 322. In some examples, one or more instructions 322 may be the same as or similar to one or more instructions 122 and/or one or more instructions 222, as described above.

In the example of FIG. 3, third network device 300 may engage in any network data transmission operations, including, but not limited to, switching, routing, bridging, or a combination thereof. In some examples, third network device 300 may comprise a WAP. It will be understood by one of ordinary skill in the art that third network device 300 may be any suitable type(s) of network devices made by any suitable manufacturer(s).

In the example of FIG. 3, third network device 300 includes a network interface 330 having the third MAC address. Network interface 330 may comprise a NIC having one or more ports (e.g., Ethernet ports), one or more sockets, one or more adapters, or a combination thereof. Moreover, although FIG. 3 shows that third network device 300 comprises one network interface 330, it will be understood that third network device 300 may any suitable number and type(s) of network interfaces.

In the example of FIG. 3, network interface 330 may comprise a radio having the third MAC address. In some examples, one or more BSSIDs may corresponding to the third MAC address of the radio of network interface 330. In some examples, the radio may operate at one or more frequency bands. For example, the radio may operate at a 5 GHz band which conforms to the IEEE 802.11ac standard, a 2.4 GHz band which conforms to one or more of the IEEE 802.11ac, 802.11n, and 802.11g standards, or a combination thereof. It will be understood by one skilled in the art that the radio of network interface 330 may transmit and receive wireless signals that conform to any suitable type(s) of wireless communications standard(s), now known or later developed, and/or operate at any suitable frequency range(s). In some examples, the radio may comprise an antenna which transmits directional and/or omnidirectional signals. In some examples, the radio may comprise a phased array antenna. It will be understood by one skilled in the art that the radio of network interface 330 may comprise any suitable type(s) of antenna(s), now known or later developed. Moreover, it will be understood that third network device 300 may comprise, two, four, eight, or any suitable number of radios, and that third network device 300 may have a same number or a different number of radios as first network device 100 and/or second network device 200.

In the example of FIG. 3, third network device 300 may establish communication link 340 with network coordinator 250 (as shown in FIG. 2.) In the example of FIG. 3, third network device 300 may establish communication link 160 with first network device 100. In the example of FIG. 3, third network device 300 may establish wireless communication link 350 with network interface 230 of second network device 200. In some examples, wireless communication link 350 may be established via network interface 330. Moreover, in the example of FIG. 3, third network device 300 may establish wireless communication links for one or more nodes of a WLAN. In some examples, one or more of communication links 340, 350, and 360 may be established via network interface 330. In some examples, one or more of communication links 340, 350, and 360 may comprise a wired link, such as a wire, a cable, an optical fiber, or the like, or a combination thereof, a wireless link, such as a Wi-Fi link, a Bluetooth® link, a BLE link, a ZigBee® link, a Z-Wave® link, a cellular link, or the like, or a combination thereof, or a combination of at least one wired link and at least one wireless link. It will be understood by one skilled in the art that each of communication links 340, 350, and 360 may use any suitable type(s) of wired and/or wireless link(s), now known or later developed. In some examples, one or both of communication links 340 and 360 may use at least one connection-oriented protocol such as TCP, at least one connectionless protocol such as UDP, or the like, or a combination thereof. It will be understood by one skilled in the art that each of wireless communication links 340 and 360 may use any suitable type(s) of data transmission protocol(s), now known or later developed. In some examples, communication link 350 may use at least one connectionless protocol, such as UDP. It will be understood by one skilled in the art that communication link 350 may use any suitable type(s) of data transmission protocol(s), now known or later developed.

In the example of FIG. 3, instructions 322 may be configured to transmit, to the network coordinator, a signal 342 indicating the third MAC address. In some examples, signal 342 may be transmitted to the network coordinator via communication link 340. In the example of FIG. 3, instructions 322 may be configured to, based on (e.g., in response to) signal 342, receive request 344 to wake-up the second network device. Signal 342 may comprise at least one packet having a payload configured to indicate to the network coordinator the third MAC address, a netmask corresponding to the subnet assigned to the third MAC address, or a combination thereof. Signal 342 may comprise at least one frame having a source MAC address that corresponds to a MAC address (e.g., third MAC address) of third network device 300 and/or a destination MAC address that corresponds to a MAC address associated with the network coordinator. Signal 342 may comprise at least one packet having a source IP address that corresponds to an IP address assigned to third network device 300 and/or a destination IP address that corresponds to an IP address assigned to the network coordinator. It will be understood that signal 342 may comprise any suitable type of frame and/or packet with any suitable type(s) of payload(s).

In the example of FIG. 3, instructions 322 may be configured to receive request 344 from the network coordinator based on signal 342 received by the network coordinator. In some examples, request 344 may be received from the network coordinator via communication link 340. Request 344 may comprise at least one frame having a destination MAC address that corresponds to a MAC address (e.g., third MAC address) of third network device 300. Request 344 may comprise at least one packet having a source IP address that corresponds to an IP address assigned to a network coordinator and/or a destination IP address that corresponds to an IP address assigned to third network device 300. Request 344 may comprise at least one packet having a payload configured to indicate to third network device 300 the first MAC address, the second MAC address, the third MAC address, a netmask corresponding to the subnet assigned to the first, second and third MAC addresses, or a combination thereof. It will be understood that request 344 may comprise any suitable type of frame and/or packet with any suitable type(s) of payload(s).

In the example of FIG. 3, instructions 322 may be configured to receive request 162 from first network device 100 to determine whether a wake-up frame having a destination address of the second MAC address was transmitted by network interface 130 of first network device 100. In some examples, request 162 may be received from first network device 100 via communication link 160. In some examples, request 162 may be receive from first network device 100 via network interface 330. In the example of FIG. 3, instructions 322 may be configured to, based on (e.g., in response to) request 162, determine whether the wake-up frame was transmitted by network interface 130 of first network device 100.

In the example of FIG. 3, instructions 322 may be configured to determine whether the wake-up frame was transmitted by network interface 130 of first network device 100. In the example of FIG. 3, instructions 322 may, based on (e.g., in response to) a signal (e.g., request 162) received by third network device 300, determine whether the wake-up frame was transmitted by network interface 130 of first network device 100. In some examples, instructions 322 may determine whether the wake-up frame was transmitted by network interface 130 of first network device 100 by sniffing (i.e., monitoring), by network interface 320, for the wake-up frame transmitted by network interface 130 of first network device 100. Instructions 322 may be configured to sniff for the wake-up frame for a predetermined time period. In some examples, instructions 322 may determine whether the wake-up frame was transmitted by network interface 130 by monitoring, by network interface 320, for a signal indicating that the wake-up frame was transmitted by network interface 130 of first network device.

In the example of FIG. 3, instructions 322 may be configured to, based on a determination that the wake-up frame was not transmitted by network interface 130 of first network device 100, generate a second wake-up frame 352 having a destination address of the second MAC address and configured to cause second network device 200 to transition from operating in the first power mode to operating in the second power mode. Second wake-up frame 352 may have the third MAC address as a source address. Second wake-up frame 352 may comprise a packet which is configured to cause second network device 200 to wake-up. In some examples, the packet may contains anywhere within its payload 6 bytes each having a value of 255 (i.e., FF FF FF FF FF FF in hexadecimal), followed by sixteen repetitions of the target computing device's 48-bit MAC address, for a total of 102 bytes. It will be understood that second wake-up frame 352 may comprise any suitable type of frame comprising any suitable type of packet with any suitable type(s)

of payload(s). In the example of FIG. 3, instructions 322 may be configured to, based on a determination that the wake-up frame was not transmitted by network interface 130 of first network device 100, transmit a signal indicating that the wake-up frame was not transmitted by network interface 130 of first network device 100. In some examples, the signal may be transmitted to first network device 100. In some examples, the signal may be transmitted to the network controller.

In the example of FIG. 3, instructions 322 may be configured to, based on a determination that the wake-up frame was transmitted by network interface 130 of first network device 100, transmit a signal indicating that the wake-up frame was transmitted by network interface 130 of first network device 100. In some examples, the signal may be transmitted to first network device 100 via communication link 160. In some examples, the signal may be transmitted to the network coordinator (i.e., network coordinator 250.) In some examples, the signal may be transmitted the network coordinator via communication link 340. In some examples, the signal may be transmitted to first network device 100 and/or the network coordinator via network interface 330.

In the example of FIG. 3, instructions 322 may be configured to transmit, by network interface 330, second wake-up frame 352 to the second MAC address of second network device 200. That is, instructions 322 may be configured to transmit second wake-up frame 352 as an L2 unicast frame to the second MAC address of the second network device. In some examples, second wake-up frame 352 may be transmitted to the second network device via communication link 350.

In the example of FIG. 3, instructions 322 may be configured to receive an acknowledgment frame 354 based on second wake-up frame 352 received at the second MAC address of second network device 200. In some examples, acknowledgement frame 354 may be received by network interface 330 of third network device 300. In some examples, acknowledgement frame 354 may be received from second network device 200 via communication link 350. Acknowledgment frame 354 may have the second MAC address as a source address and the third MAC address as a destination address. Acknowledgement frame 354 may comprise a packet having a payload that is configured to indicate to third network device 300 that second wake-up frame 352 was received at the second MAC address of the second network device. It will be understood that acknowledgment frame 354 may comprise any suitable type of frame comprising any suitable type of packet with any suitable type(s) of payload(s).

In the example of FIG. 3, instructions 322 may be configured to, based on (e.g., in response to) a triggering event, determine that second wake-up frame 252 was received at the second MAC address of the second network device. In some examples, the triggering event may be a signal received by third network device 300 from a computing device (e.g., the second network device, a client device, etc.) In some examples, the triggering event may occur after a predetermined time period after second wake-up frame 352 is received at the second MAC of the second network device.

In this manner, the example system 301 of FIG. 3 may provide improved wake-up by a network device. For instance, instructions 322 may be configured, in response to request 162 and based on the determination that the wake-up frame was not transmitted by network interface 130 of first network device 100, generate second wake-up frame 352 having a destination address of the second MAC address and configured to cause second network device 200 to transition from operating in the first power mode to operating in the second power mode, and transmit second wake-up frame 352 to second MAC address of second network device 200, thereby allowing wake-up of the second network device without requiring transmitting a broadcast frame. Thus, example system 301 may provide greater reliability as compared to existing WoL and WoWLAN techniques, which require transmitting magic packets as broadcast frames which can be dropped by intermediate routers. Moreover, example system 301 may provide greater ease of implementation and less vulnerability to flooding because unlike existing WoL and WoWLAN techniques, system 301 does not require configuring intermediate routers between network devices to forward magic packets as SDBs.

Furthermore, system 301 may provide greater reliability for wake-up by a network device. For instance, instructions 322 may be configured to, based on a determination that the wake-up frame was transmitted by network interface 130 of first network device 100, transmit a signal indicating that the wake-up frame was transmitted by network interface 130 of first network device 100, thereby providing confirmation that the wake-up frame was transmitted by first network device 100. Moreover, instructions 322 may, based on the determination that the wake-up frame was not transmitted by network interface 130 of first network device 100, generate second wake-up frame 352 having a destination address of the second MAC address and configured to cause second network device 200 to transition from operating in the first power mode to operating in the second power mode, and transmit second wake-up frame to second MAC address of second network device 200, thereby providing greater reliability when first network device 100 may not transmit the wake-up frame due to various circumstances (e.g., first network device 100 becomes inoperable, loses connection to the WLAN, etc.)

Moreover, although FIG. 3 shows that system 301 comprises three network devices, it will be understood that system 301 may comprise any suitable number of network devices. For instance, system 301 may comprise a plurality of network devices which may determine whether a wake-up frame was transmitted by network interface 130 of first network device 100, whether a wake-up frame was transmitted by network interface 330 of third network device 300, or a combination thereof. It will be understood by one skilled in the art that increasing the number of network devices which may determine whether a wake-up frame was transmitted by one or more network devices of system 301 may increase the reliability of system 301.

Figure 4A:
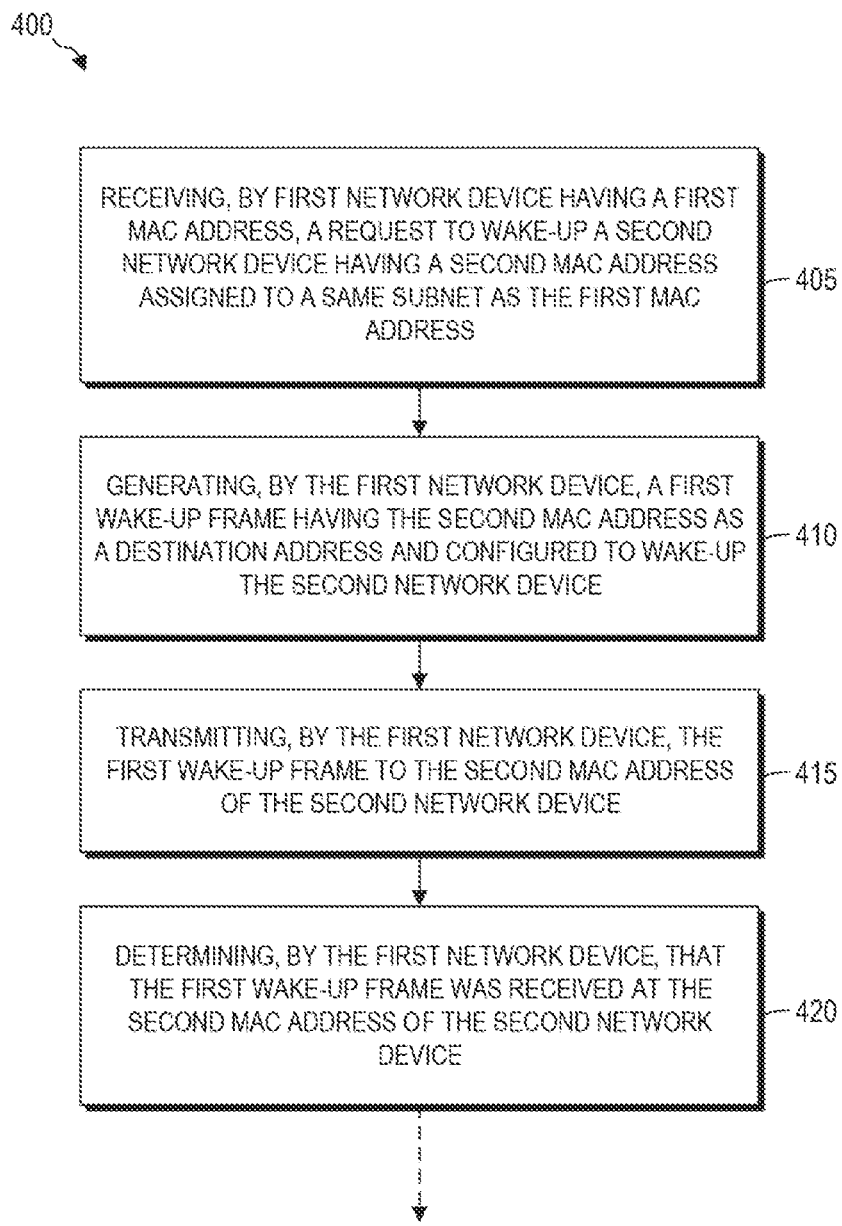
FIGS. 4A and 4B show a flowchart for wake-up by an example network device.
Figure 4B:
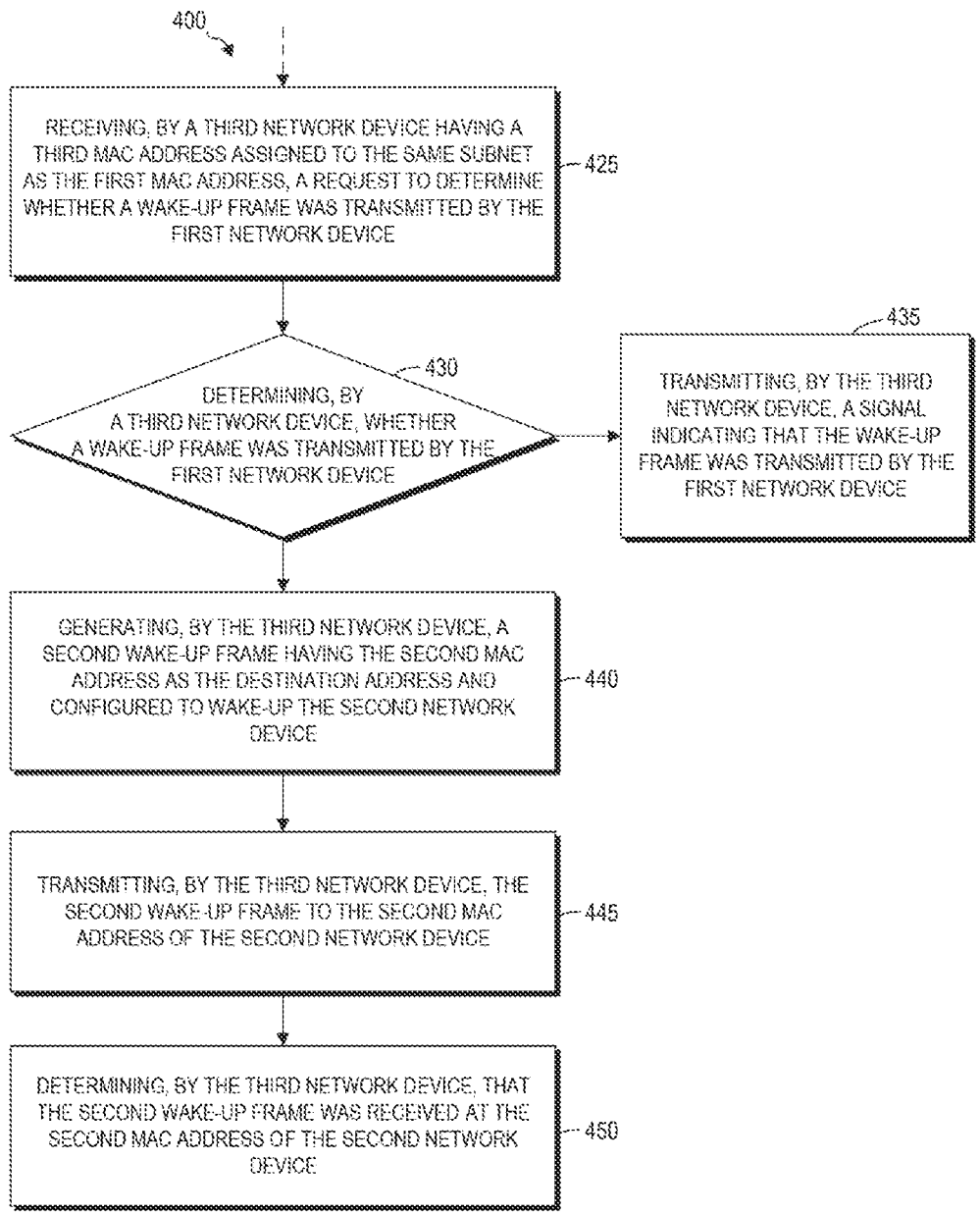

FIGS. 4A and 4B show functionality 400 for a network device, according to one example. Functionality 400 may be implemented as a method or may be executed as one or more instructions on a machine (e.g., by at least one processor), where the one or more instructions are included on at least one machine-readable storage medium (e.g., a non-transitory machine readable-storage medium.) While only ten blocks are shown in functionality 400, functionality 400 may include other actions described herein. Additionally, although the blocks are shown in an order, blocks depicted in FIGS. 4A and 4B may be performed in any order and at any time. Also, some of the blocks shown in functionality 400 may be omitted without departing from the spirit and scope of this disclosure. Functionality 400 may be implemented on a network device according to any of the examples herein.

As shown in block 405, functionality 400 may include receiving, by a first network device having a first MAC address, a request to wake-up a second network device having a second MAC address assigned to a same subnet as the first MAC address. The first network device may receive the request via a network interface. Additionally, the request may be received by a radio of the network interface of the first network device. In some examples, the request may be received from a network coordinator.

As shown in block 410, functionality 400 may include generating, by the first network device, a first wake-up frame having the second MAC address as a destination address and configured to wake-up the second network device. The first wake-up frame may be generated based on (e.g., in response to) the request to wake-up the second network device. The first wake-up frame may be configured to wake-up the second network device by causing the second network device to transition from operating in a first power mode to operating in a second power mode.

As shown in block 415, functionality 400 may include transmitting, by the first network device, the first wake-up frame to the second MAC address. The first wake-up frame may be transmitted based on (e.g., in response to) the request to wake-up the second network device. The first network device may transmit the first wake-up frame via a network interface, and the second network device may receive the first wake-up frame via a network interface. Additionally, the first wake-up frame may be transmitted by a radio of the network interface of the first network device, and the first wake-up frame may be received by a radio of the network interface of the second network device.

As shown in block 420, functionality 400 may include determining, by the first network device, that the first wake-up frame was received at the second MAC address of the second network device. In some examples, the first network device may determine that the first wake-up frame was received at the second MAC address of the second network device based on (e.g., in response to) a triggering event. The triggering event may comprise receiving, by the first network device, a signal from a computing device which indicates that the first wake-up frame was received at the second MAC address of the second network device. The first network device may receive the signal via a network interface. Additionally, the signal may be received by a radio of the network interface of the first network device. In some examples, the triggering event may occur after a predetermined time period after the second network device receives the first wake-up frame at the second MAC address.

In some examples, the first network device may determine that the first wake-up frame was received at the second network device by receiving, by the first network device, an acknowledgment frame based on the first wake-up frame received at the second MAC address. The first network device may receive the acknowledgement frame via a network interface, and the second network device may transmit the acknowledgment packet via a network interface. Additionally, the acknowledgement frame may be received by a radio of the network interface of the first network device, and the acknowledgement frame may be transmitted by a radio of the network interface of the second network device.

As shown in block 425, functionality 400 may include receiving, by a third network device having a third MAC address assigned to the same subnet as the first MAC address, a request to determine whether a wake-up frame was transmitted by the first network device. The third network device may receive the request via a network interface. Additionally, the request may be received by a radio of the network interface of the third network device. The request may be received from the first network device.

As shown in block 430, functionality 400 may include determining, by a third network device, whether a wake-up frame was transmitted by the first network device. The wake-up frame determined to be transmitted to the second MAC address may be the first wake-up frame. In some examples, the third network device may determine whether the wake-up frame was transmitted by the first network device by sniffing (i.e., monitoring), by a radio of the third network device, for the wake-up frame. Additionally, sniffing for the wake-up frame may be for a predetermined time period. In some examples, the third network device may determine whether the wake-up frame was transmitted to the second MAC address by monitoring for a signal indicating that the wake-up frame was transmitted by a third network device.

If it is determined that the wake-up frame was transmitted by the first network device, then functionality 400 proceeds to block 435. If it is determined that the wake-up frame was not transmitted by the first network device, then functionality 400 proceeds to block 440.

As shown in block 435, functionality 400 may include transmitting, by the third network device, a signal indicating that the wake-up frame was transmitted by the first network device. In some examples, the third network device may transmit the signal to the first network device. In some examples, the third network device may transmit the signal to the network coordinator. The third network device may transmit the signal via a network interface. Additionally, the signal may be transmitted by a radio of the network interface of the third network device.

As shown in block 440, functionality 400 may include generating, by the third network device, a second wake-up frame having a destination address of the second MAC address and configured to wake-up the second network device. The second wake-up frame may be configured to wake-up the second network device by causing the second network device to transition from operating in a first power mode to operating in a second power mode.

As shown in block 445, functionality 400 may include transmitting, by the third network device, the second wake-up frame to the second MAC address of the second network device. The third network device may transmit the second wake-up frame via a network interface, and the second network device may receive the second wake-up frame via a network interface. Additionally, the second wake-up frame may be transmitted by a radio of the network interface of the third network device, and the second wake-up frame may be received by a radio of the network interface of the second network device.

As shown in block 450, functionality 400 may include determining, by the third network device, that the second wake-up frame was received at the second MAC address of the second network device. In some examples, the third network device may determine that the second wake-up frame was received at the second MAC address of the second network device based on (e.g., in response to) a triggering event. The triggering event may comprise receiving, by the third network device, a signal from a computing device which indicates that the second wake-up frame was received at the second MAC address of the second network device. The third network device may receive the signal via a network interface. Additionally, the signal may be received by a radio of the network interface of the third network device. In some examples, the triggering event may occur after a predetermined time period after the second network device receives the first wake-up frame at the second MAC address.

In some examples, the third network device may determine that the second wake-up frame was received at the second network device by receiving, by the third network device, an acknowledgment frame based on the second wake-up frame received at the second MAC address. The third network device may receive the acknowledgement frame via a network interface, and the second network device may transmit the acknowledgment packet via a network interface. Additionally, the acknowledgement frame may be received by a radio of the network interface of the third network device, and the acknowledgement frame may be transmitted by a radio of the network interface of the second network device.

In this manner, functionality 400 may provide improved wake-up by a network device. For instance, functionality 400 may include receiving, by a first network device having a first MAC address, a request to wake-up a second network device having a second MAC address assigned to a same subnet as the first MAC address (at block 405), generating, by the first network device, a first wake-up frame having the second MAC address as a destination address and configured to wake-up the second network device (at block 410), and transmitting, by the first network device, the first wake-up frame to the second MAC address (at block 415), thereby allowing wake-up of the second network device without requiring transmitting a broadcast frame. Thus, functionality 400 may provide greater reliability as compared to existing WoL and WoWLAN techniques, which require transmitting magic packets as broadcast frames which can be dropped by intermediate routers. Moreover, functionality 400 may provide greater ease of implementation and less vulnerability to flooding because unlike existing WoL and WoWLAN techniques, functionality 400 does not require configuring intermediate routers between network devices to forward magic packets as SDBs.

Furthermore, functionality 400 may provide greater reliability for wake-up by a network device. For instance, functionality 400 may include determining, by a third network device, that a wake-up frame was transmitted by the first network device (at block 430), and transmitting a signal indicating that the wake-up frame was transmitted by the first network device (at block 435), thereby providing confirmation that the wake-up frame was transmitted by first network device. Moreover, functionality 400 may include determining, by a third network device, that a wake-up frame was not transmitted by the first network device (at block 430), and generating, by the third network device, a second wake-up frame having a destination address of the second MAC address and configured to wake-up the second network device (at block 440), and transmitting, by the third network device, the second wake-up frame to the second MAC address of the second network device (at block 445), thereby providing greater reliability when the first network device may not transmit the wake-up frame due to various circumstances (e.g., the first network device becomes inoperable, loses connection to the WLAN, etc.)

Figure 5:
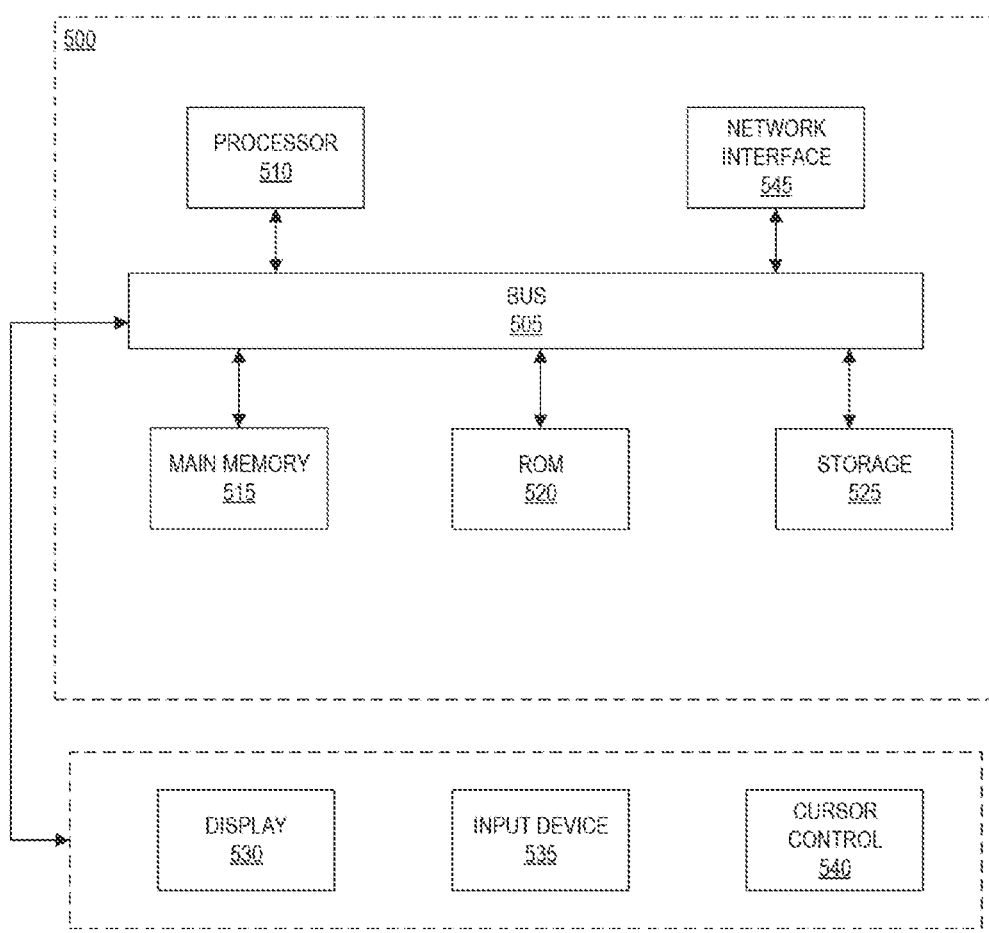
FIG. 5 is a block diagram of an example computer system in which various embodiments described herein may be implemented.

FIG. 5 is a block diagram of an example computer system 500 in which various embodiments described herein may be implemented.

Computer system 500 includes bus 505 or other communication mechanism for communicating information, at least one hardware processor 510 coupled with bus 505 for processing information. At least one hardware processor 510 may be, for example, at least one general purpose microprocessor.

Computer system 500 also includes main memory 515, such as random access memory (RAM), cache, other dynamic storage devices, or the like, or a combination thereof, coupled to bus 505 for storing information and one or more instructions to be executed by at least one processor 510. Main memory 515 also may be used for storing temporary variables or other intermediate information during execution of one or more instructions to be executed by at least one processor 510. Such one or more instructions, when stored on storage media accessible to at least one processor 510, render computer system 500 into a special-purpose machine that is customized to perform the operations specified in the one or more instructions.

Computer system 500 further includes read only memory (ROM) 520 or other static storage device coupled to bus 505 for storing static information and one or more instructions for at least one processor 510. At least one storage device 525, such as a magnetic disk, optical disk, or USB thumb drive (Flash drive), or the like, or a combination thereof, may be provided and coupled to bus 505 for storing information and one or more instructions.

Computer system 500 may further include display 530 coupled to bus 505 for displaying a graphical output to a user. The computer system 500 may further include input device 535, such as a keyboard, camera, microphone, or the like, or a combination thereof, coupled to bus 505 for providing an input from a user. Computer system 500 may further include cursor control 540, such as a mouse, pointer, stylus, or the like, or a combination thereof, coupled to bus 505 for providing an input from a user.

Computer system 500 may further includes at least one network interface 545, such as a network interface controller (NIC), network adapter, or the like, or a combination thereof, coupled to bus 505 for connecting computer system 500 to at least one network.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Per, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored on a compressed or installable format that requires installation, decompression or decryption prior to execution.) Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to at least one processor 510 executing one or more sequences of one or more instructions contained in main memory 515. Such one or more instructions may be read into main memory 515 from another storage medium, such as at least one storage device 525. Execution of the sequences of one or more instructions contained in main memory 515 causes at least one processor 510 to perform the process steps described herein. In alternative embodiments, hard-wired circuitry may be used in place of or in combination with software instructions.

As used herein, the term "Wi-Fi" is meant to encompass any type of wireless communications that conforms to the Institute of Electrical and Electronic Engineers (IEEE) 802.11 standard, whether 802.11ac, 802.11ad, 802.11 ay, 802.11ax, 802.11g, etc. The term "Wi-Fi" is currently promulgated by the Wi-Fi Alliance. Any products tested and approved as "Wi-Fi Certified" (a registered trademark) by the Wi-Fi Alliance are certified as interoperable with each other, even if they are from different manufacturers. A user with a "Wi-Fi Certified" product can use any brand of WAP with any other brand of client hardware that also is certified. Typically, however, any Wi-Fi product using the same radio frequency (e.g., 5 GHz for 802.11ac) will work with any other, even if such products are not "Wi-Fi Certified." The term "Wi-Fi" is further intended to encompass future versions and/or variations on the foregoing communication standards. Each of the foregoing standards is hereby incorporated by reference.

As used herein, the term "Bluetooth" (a registered trademark) is meant to encompass any type of wireless communications that conforms to at least one of the Bluetooth specifications. As used therein, the term "Bluetooth Low Energy" (a registered trademark) or "BLE" is meant to encompass any type of wireless communications that conforms to at least one of the Bluetooth® Low Energy specifications. The terms "Bluetooth" and "Bluetooth Low Energy" are currently promulgated by the Bluetooth Special Interest Group (SIG).

As used herein, the term "ZigBee" (a registered trademark) is meant to encompass any type of wireless communication that conforms to at least one of the specifications of the ZigBee Specification. The term "ZigBee" is currently promulgated by the ZigBee Alliance.

As used herein, the term "Z-Wave" (a registered trademark) is meant to encompass any type of wireless communication that conforms to at least one of the Z-Wave protocols. The term "Z-Wave" is currently promulgated by Zensys A/S Corporation.

As used herein, the term "non-transitory media," and similar terms, refers to any electronic, magnetic, optical, or other physical storage device that contains or stores executable instructions. Non-transitory media may comprise non-volatile media and/or volatile media. Non-volatile media includes, for example, optical or magnetic disks. Volatile media includes, for example, dynamic memory. Common forms of non-transitory machine-readable media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

While the present techniques may be susceptible to various modifications and alternative forms, the examples discussed above have been shown only by way of example. It is to be understood that the techniques are not intended to be limited to the particular examples disclosed herein. Indeed, the present techniques include all alternatives, modifications, and equivalents falling within the true spirit and scope of the appended claims.

The invention claimed is:

1. A first network device of a plurality of network devices, comprising:
   a network interface having a first Media Access Control (MAC) address;
   a first processing resource; and
   a first machine-readable storage medium comprising instructions executable by the first processing resource to:
   receive a request to wake-up a second network device of the plurality of network devices, the second network device having a second MAC address that is assigned to a same subnet as the first MAC address;
   in response to the request, generate a first wake-up frame having the second MAC address as a destination address and configured to cause the second network device to transition from operating in a first power mode to operating in a second power mode; and
   transmit, by the network interface of the first network device of the plurality of network devices, the first wake-up frame as an L2 unicast frame to only the second MAC address of the second network device.

2. The first network device of claim 1, wherein the instructions comprise instructions to:

based on a triggering event, determine that the first wake-up frame was received at the second MAC address of the second network device.

3. The first network device of claim 1, wherein the instructions comprise instructions to:
transmit, to a network coordinator, a signal indicating the first MAC address; and
based on the signal, receive the request to wake-up the second network device.

4. The first network device of claim 1, wherein the instructions comprise instructions to:
based on the first wake-up frame transmitted to the second MAC address of the second network device, transmit, to a third network device, a signal indicating that the first wake-up frame was transmitted to the second MAC address of the second network device.

5. A system, comprising:
the first network device of a plurality of network devices of claim 1; and
a second network device of the plurality of network devices, comprising:
a network interface having the second MAC address;
a second processing resource; and
a second machine-readable storage medium comprising instructions executable by the second processing resource to:
receive wirelessly, by the network interface, the first wake-up frame; and
in response to the first wake-up frame, transition from operating in the first power mode to operating in the second power mode.

6. A system, comprising:
the first network device of a plurality of network devices of claim 1; and
a network coordinator, comprising:
at least one processing resource; and
at least one machine-readable storage medium comprising instructions executable by the at least one processing resource to:
receive a first signal indicating the first MAC address;
receive a second signal indicating the second MAC address;
based on the first signal and the second signal, transmit wirelessly, to the first network device, the request to wake-up the second network device of the plurality of network devices.

7. The system of claim 6, wherein the instructions comprise instructions to:
receive a third signal indicating a third MAC address of a third network device, wherein the third MAC address is assigned to the same subnet as the first and second MAC addresses; and
based on the third signal, transmit, to the third MAC address of the third network device, a request to determine whether a wake-up frame was transmitted by the first network device to the second MAC address of the second network device.

8. A method, comprising:
receiving, by a network interface of a first network device of a plurality of network devices having a first Media Access Control (MAC) address, a request to wake-up a second network device of the plurality of network devices having a second MAC address that is assigned to a same subnet as the first MAC address;
in response to the request, generating, by the first network device of the plurality of network devices, a first wake-up frame having a destination address of the second MAC address and configured to cause the second network device of the plurality of network devices to transition from operating in the first power mode to operating in the second power mode; and
transmitting, by the network interface of the first network device of the plurality of network devices, an L2 unicast frame comprising the first wake-up frame to the second MAC address of the second network device of the plurality of network devices in a non-broadcast signal.

9. The method of claim 8, further comprising:
based on a triggering event, determining, by the first network device, that the first wake-up frame was received at the second MAC address of the second network device.

10. The method of claim 8, further comprising:
transmitting, to a network coordinator, a first signal indicating the first MAC address;
transmitting, to the network coordinator, a second signal indicating the second MAC address; and
based on the first and second signals, receiving, by the first network device, the request to wake-up the second network device.

11. The method of claim 8, further comprising:
transmitting, to a network coordinator, a third signal indicating a third MAC address of a network interface of a third network device, wherein the third MAC address is assigned to the same subnet as the first and second MAC addresses; and
receiving, by the third network device and based on the third signal received by the network coordinator, a request to determine whether a wake-up frame was transmitted by the first network device to the second MAC address of the second network device.

12. A least one non-transitory machine-readable storage medium comprising instructions executable by the at least one processing resource of a first network device to:
receive, by a network interface of a first network device of a plurality of network devices, a request to wake-up a second network device of the plurality of network devices, wherein the network interface has a first media access control (MAC) address and the second network device has a second MAC address assigned to a same subnet as the first MAC address;
in response to the request, generate, by the first network device of the plurality of network devices, a first wake-up frame having the second MAC address as a destination address and configured to cause the second network device of the plurality of network devices to transition from operating in the first power mode to operating in the second power mode; and
transmit within a non-broadcast signal, by the network interface of the first network device of the plurality of network devices, the wake-up frame as an L2 unicast frame, to the second MAC address of the second network device of the plurality of network devices.

13. The article of claim 12, wherein the instructions comprise instructions executable by the at least one processing resource to:
based on a triggering event, determine, by the first network device, that the first wake-up frame was received at the second MAC address of the second network device.

14. The article of claim 12, wherein the instructions comprise instructions executable by the at least one processing resource to:

transmit, to a network coordinator, a signal indicating the first MAC address; and based on the signal, receive, by the first network device, the request to wake-up the second network device.

15. The article of claim 12, wherein the instructions comprise instructions executable by the at least one processing resource to:

based on the first wake-up frame transmitted to the second MAC address of the second network device, transmit, to a third network device, a signal indicating that the first wake-up frame was transmitted to the second MAC address of the second network device.

* * * * *